(No Model.) 2 Sheets—Sheet 1.

N. SCHRODER & E. S. ADAMS.
PHOTOGRAPHIC CAMERA.

No. 364,864. Patented June 14, 1887.

WITNESSES:
C. Neveux
C. Sedgwick

INVENTOR:
N. Schroder
E. S. Adams
BY Munn & Co.
ATTORNEYS.

(No Model.) 2 Sheets—Sheet 2.
N. SCHRODER & E. S. ADAMS.
PHOTOGRAPHIC CAMERA.
No. 364,864. Patented June 14, 1887.
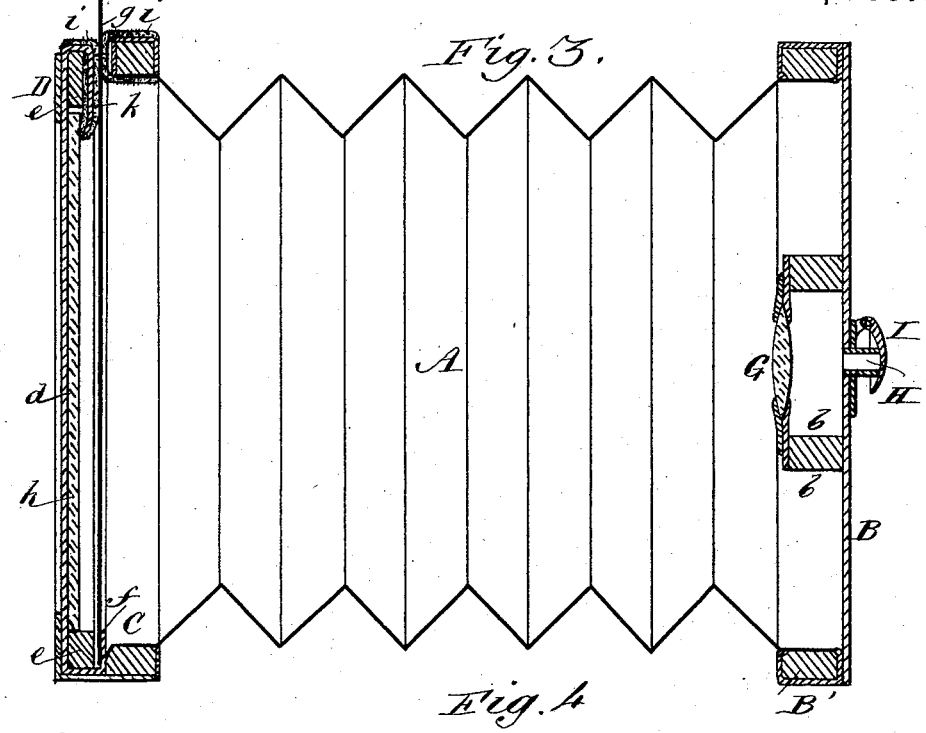
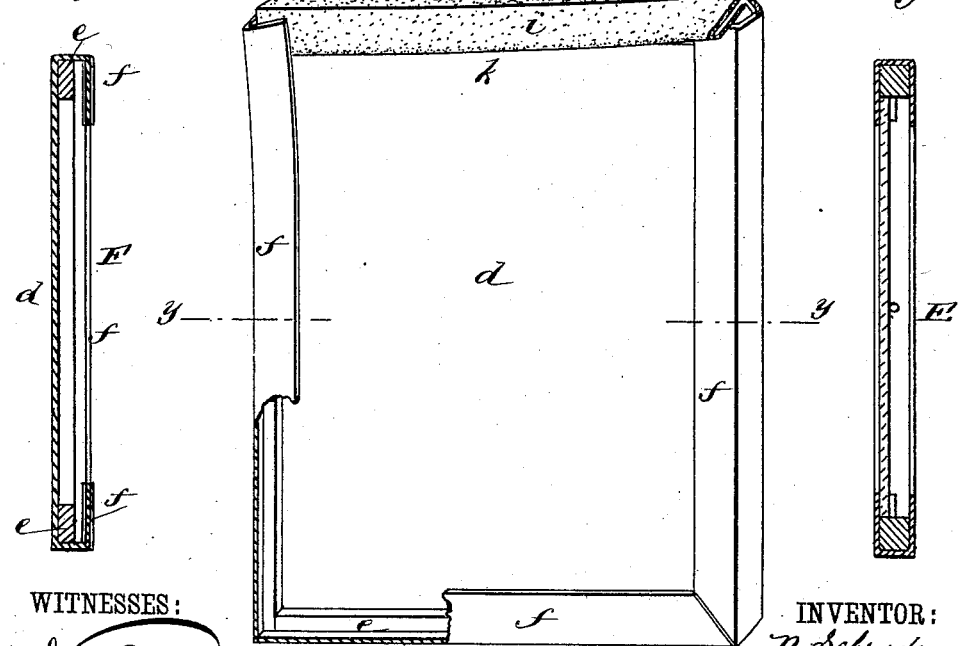
WITNESSES:
C. Neveux
C. Sedgwick
INVENTOR:
N. Schroder
E. S. Adams
BY Munn & Co
ATTORNEYS.

UNITED STATES PATENT OFFICE.

NICHOLAS SCHRODER AND EDWARD S. ADAMS, OF BROOKLYN, NEW YORK.

PHOTOGRAPHIC CAMERA.

SPECIFICATION forming part of Letters Patent No. 364,864, dated June 14, 1887.

Application filed November 4, 1886. Serial No. 217,982. (No model.)

*To all whom it may concern:*

Be it known that we, NICHOLAS SCHRODER and EDWARD S. ADAMS, both of Brooklyn, in the county of Kings and State of New York, have invented new and useful Improvements in Photographic Cameras, of which the following is a full, clear, and exact description.

This invention consists in certain novel constructions and combinations of parts in a photographic camera, substantially as hereinafter described, and pointed out in the claims, whereby the front and back of the camera may be angled in various directions to adapt the focus to the different parts of subjects not lying in the same plane, an adjustable or sliding base-frame is or may be dispensed with, and a light, cheap, and efficient camera, also plate-holder suitable thereto, is or may be produced, as herein set forth.

Reference is to be had to the accompanying drawings, forming a part of this specification, in which similar letters of reference indicate corresponding parts in all the figures.

Figure 1:
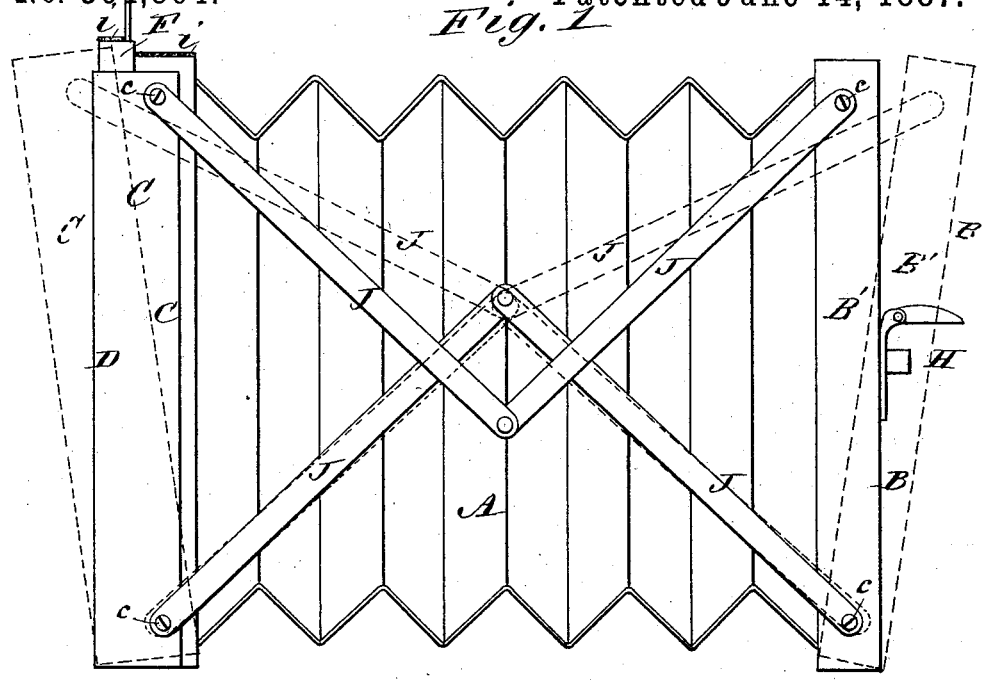
Figure 2:
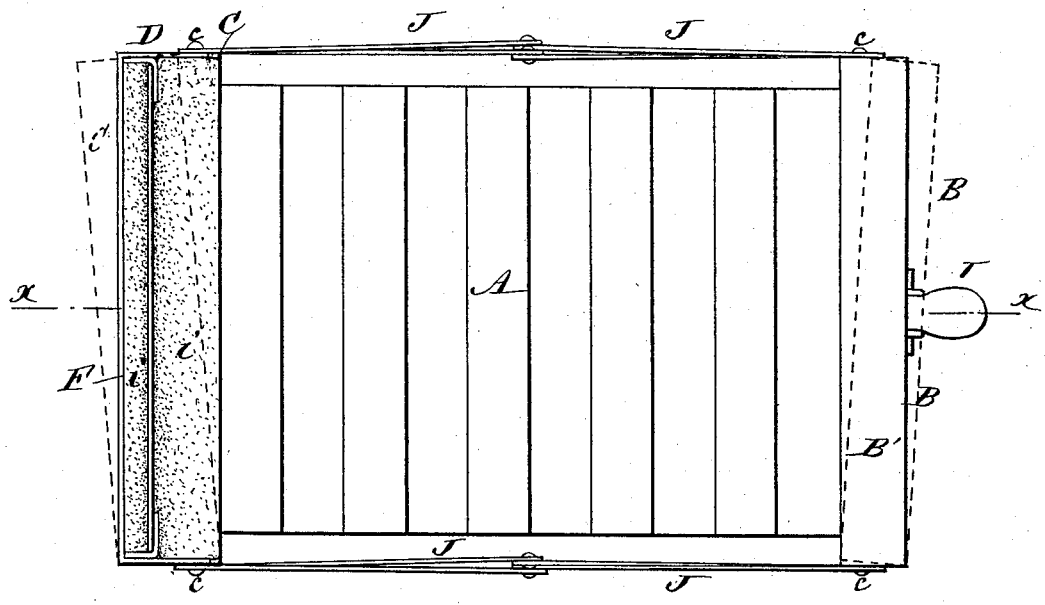

Figure 1 represents a side elevation of a photographic camera embodying our invention, and Fig. 2 is a top or plan view of the same. Fig. 3 is a vertical section of the camera upon the line $x\ x$ in Fig. 2. Fig. 4 is an inner face view of a plate-holder used in the camera, with certain parts broken away and omitting the sliding shutter used in connection therewith, and Fig. 5 is a transverse section of the same upon the line $y\ y$ in Fig. 4. Fig. 6 is a transverse section of a ground-glass holder or focusing-slide suitable for use in the camera.

A is the bellows of the camera, made of any suitable flexible material, but preferably of cloth-covered paper.

B is the front board secured to the front end bellows-frame, B', and which may be a simple cloth-covered card, while the frame B' may be of wood; but any other suitable materials may be used for these and other parts.

C is the rear end frame of the camera body or bellows A, provided with a pocket, D, which is also preferably made of cloth-covered paper for reception successively of the focusing-slide E and plate-holder F, as usual.

The frames or supports for the ends of the bellows may be otherwise constructed than shown, if desired.

G is the lens of the camera arranged within the bellows-body of the apparatus at a suitable distance in rear of the front board, B, by which, or by a short casing, $b$, mounted on the back of the board D, said lens is carried and may be secured in any suitable manner.

The stop or, as it is sometimes termed, the "perforated diaphragm," used in connection with the lens to concentrate the rays of light, we arrange at a suitable distance in front of the lens. This stop we make in the form of a tube, H, projecting in front of the board B, whereby it may also be used as a stop for the shutter, which is here shown as a hinged thumb one, I, that, when closed, covers the outer end of the tubular stop H, but which, when thrown up or open, exposes the tube to the passage of light through it. A sliding or other form of shutter may be used instead of the hinged one, if desired.

The camera is designed to be used without any sliding base-frame to expand or contract the bellows, and may be either mounted upon a tripod seated upon a table, or be otherwise supported or held, and while it provides in a most efficient manner for angling the plate relatively to the lens in what are known as "swing-back" cameras, it dispenses with the usual special mechanism for making such adjustment, and admits of either the back or front of the camera, or both, being angled as desired. To these several ends, or either of them, we provide the camera-body, preferably on opposite sides, with what is known as a "lazy-tongs attachment," that consists of a series of rods or bars, J, jointed to and arranged to cross each other and connected at their outer ends by pivots $c\ c$ with the upper and lower portions of the front and back end frames of the bellows. Such lazy-tongs connections J form a supporting-frame for the bellows, to hold it in position and to admit of the bellows being expanded or contracted, as required, by simply pulling or pushing upon the end or ends of the bellows; but said lazy-tongs connections J also have another and very important function. Thus, they admit of either the back or front of the cameras, or both back and front thereof, being angled relatively to a vertical position, as shown by dotted lines in Fig. 1—that is, either in the direction there shown or in a reverse one. This provides in a very simple manner, and much more effectually than could be done by a simple swing-back arrangement, for focusing any subject in which the lines are inclined from the direct vertical, as in sitting figures, &c., and in which the difficulty presents itself of bringing the projecting portions of the subject into focus with the retiring parts and all the parts into correct definition with one another. This our lazy-tongs attachment enables us to do from the front as well as the back of the camera, and with a double swing—that is, making the back or front incline in opposite directions, to give either a special upper and lower adjustment. Furthermore, by constructing the bars J so that they may be flexed laterally—as, for instance, by making them of thin flexible or elastic metal, as shown—the lateral distances may also be changed by flexing the body of the camera laterally in either direction, so as to bring the ends of the camera closer to one another upon the one side of the apparatus than upon the other, as shown for the one direction by dotted lines in Fig. 2. This adapts the apparatus to the treatment of subjects in which one or the other side is nearer to the lens, and the same means which answers for the vertical adjustment also serves for the lateral adjustment.

We are aware that a system of lazy-tongs or crossed levers has before been applied to opposite sides of a camera and made to connect the front and back end frames of its extensible body; but in such previous instance said levers have been of unequal length, and one pair of each set has been connected with a stationary back main frame at distant points and another pair of each set has been connected to the front frame of the bellows or extensible body at one and the same point, whereby provision was afforded for oscillating the front and maintaining it at different angles and for swinging it up and down at various angles or in a vertical plane. Such construction, however, does not provide for angling the back as well as the front of the camera, and which often is very desirable in order to bring portions of the subject into focus which are in different planes with each other and with the main or general plane of the subject—as, for instance, the knees and lower portions of the limbs of a sitting figure and the head or upper portion of the same figure. Our improved construction, however, effectually provides for this back and front angling adjustment in a separate manner, and so that when, for instance, the front has been angled to bring the one portion of the figure into proper definition the back of the camera may be afterward angled to bring another portion of the figure into proper definition also, and all the parts into correct definition with one another. To accomplish this by the simple and convenient means of a lazy-tongs connection between the back and front frames of the extensible body, it is not only necessary that the back end frame, C, should be capable of being angled, but also the front frame, B', either in like or reverse directions and, when required, to a like extent; and in order to do this all the levers J of the lazy-tongs we make of the same length and connect both pairs of levers of each set at like distances apart, as at $c\ c$, to both the front and back end frames of the extensible camera-body.

To further combine lightness with cheapness of construction and efficiency, we make the plate-holder F mainly of a thin sheet, $d$, of material, such as card-board, and bend and secure its side and bottom margins over and to a wooden or other light frame, $e$, and re-enforce said marginal portions with a covering of cloth. These bent-over marginal portions form flexible flaps $f$ and the lower one a ledge to make close light-tight side and bottom joints with the pocket D back of the frame C and with the sides and bottom of the slide or shutter $g$ of the plate-holder, said shutter being slid or introduced down within the flaps $f$ after the plate $h$ to be photographed has been inserted to its place within the frame $e$ of the holder. The upper or mouth end of the pocket D and corresponding end of the holder F, in front and in rear of the shutter $g$, are made light-tight as follows: Around the upper portion of the frame C is secured a soft flexible covering, $i$, preferably of velvet or other soft napped material, left baggy or loose upon the pocket side of the frame C, and the plate-holder F is provided on its top or shutter-entering end with an inwardly-overlapping flap, $k$, also covered with velvet $i$ or equivalent material. This flap $k$ can be opened or thrown back when introducing the plate $h$, but is afterward closed down over the frame $e$ and tucked at its ends into the upper or open end portions of the side flaps, $f$, of the holder. When the shutter $g$ is inserted to its place, the fluffy or velvet coverings $i\ i$ will make a perfectly close light-tight joint across the shutter upon its opposite sides or faces at the mouth end of the pocket and of the plateholder.

Plate-holders constructed as described may not only be very cheaply made, but they will have little bulk and weight, so that a large number of them may be carried without inconvenience in the pocket of the operator.

Having thus described our invention, what we claim as new, and desire to secure by Letters Patent, is—

1. In a photographic camera, the combination, with the bellows or extensible body, of a back end frame and a front end frame to said body capable of being independently swung or angled, and two sets of lazy-tongs or crossed levers, all of like radius or length, and one pair of each set being connected with the back end frame at distant points and another pair of each set being together connected to the front end frame at like distant points, substantially as and for the purpose or purposes herein set forth.

2. The within-described plate-holder, consisting of an inner frame, $e$, card or sheet back $d$, bent over said frame and forming inner side and lower flaps, *f*, and the upper inner flap, *k*, having a velvet or soft flexible covering, *i*, applied to its surface, substantially as specified.

3. The combination of the back end frame, C, of the bellows, having a rear pocket, D, and soft flexible covering *i*, applied to its upper portion in relation to the pocket, as described, and the plate-holder F, having inner side and bottom flaps, *f*, and an upper flap, *k*, faced with a soft flexible covering, *i*, for operation in conjunction with the flexible covering on the upper portion of the frame C, essentially as herein set forth.

NICHOLAS SCHRODER.
EDWARD S. ADAMS.

Witnesses:
  A. GREGORY,
  EDGAR TATE.